(12) United States Patent
Nakamura et al.

(10) Patent No.: US 8,941,924 B2
(45) Date of Patent: Jan. 27, 2015

(54) HEAD-UP DISPLAY DEVICE

(75) Inventors: Go Nakamura, Susono (JP); Kunimitsu Aoki, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/614,477

(22) Filed: Sep. 13, 2012

(65) Prior Publication Data

US 2013/0010366 A1    Jan. 10, 2013

Related U.S. Application Data

(63) Continuation of application No. PCT/JP2011/056547, filed on Mar. 18, 2011.

(30) Foreign Application Priority Data

Mar. 18, 2010  (JP) ................................. 2010-063042

(51) Int. Cl.
G02B 27/14 (2006.01)
B60K 35/00 (2006.01)
G02B 5/09 (2006.01)
G02B 27/01 (2006.01)

(52) U.S. Cl.
CPC ............ G02B 27/0101 (2013.01); B60K 35/00 (2013.01); G02B 5/09 (2013.01); *B60K 2350/2052* (2013.01); *G02B 2027/015* (2013.01)
USPC ........................................................ 359/633

(58) Field of Classification Search
USPC ................................................. 359/630–638
See application file for complete search history.

(56) References Cited

U.S. PATENT DOCUMENTS

| 4,198,654 A | 4/1980 | Coulomb |
| 4,832,427 A | 5/1989 | Nanba et al. |
| 5,089,903 A | 2/1992 | Kuwayama et al. |
| 5,204,667 A | 4/1993 | Inoue |
| 5,313,326 A * | 5/1994 | Ramsbottom ................ 359/631 |
| 5,497,170 A * | 3/1996 | Kato et al. ....................... 345/9 |
| 5,589,956 A | 12/1996 | Morishima et al. |
| 5,615,023 A | 3/1997 | Yang |
| 5,964,515 A | 10/1999 | Ikeuchi et al. |
| 2005/0157398 A1 | 7/2005 | Nagaoka et al. |

(Continued)

FOREIGN PATENT DOCUMENTS

| CN | 1126321 A | 7/1996 |
| DE | 27 53 600 A1 | 6/1978 |

(Continued)

OTHER PUBLICATIONS

International Search Report issued Apr. 19, 2011 in counterpart international application No. PCT/JP2011/056547.

(Continued)

*Primary Examiner* — James Greece
(74) *Attorney, Agent, or Firm* — Sughrue Mion, PLLC

(57) ABSTRACT

A head-up display device which can be applied to various types of vehicles is provided without causing cost increase. A head-up display device which makes a virtual image to be formed by projecting display light on a windshield of a vehicle includes a housing, an indicator which is provided in the housing, and a reflector which is provided in the housing, and includes a plurality of reflecting surfaces which are arranged in parallel with each other and inclined at the same angle so that the display light which is irradiated from the indicator is reflected by the reflecting surfaces.

4 Claims, 9 Drawing Sheets

(56) References Cited

U.S. PATENT DOCUMENTS

| | | |
|---|---|---|
| 2005/0237615 A1 | 10/2005 | Urey et al. |
| 2005/0248849 A1 | 11/2005 | Urey et al. |
| 2007/0103747 A1 | 5/2007 | Powell et al. |
| 2008/0192312 A1 | 8/2008 | Hendricks et al. |
| 2008/0212194 A1 | 9/2008 | Powell et al. |
| 2008/0218822 A1 | 9/2008 | Powell et al. |

FOREIGN PATENT DOCUMENTS

| | | |
|---|---|---|
| DE | 691 19 017 T2 | 11/1996 |
| DE | 689 28 334 T2 | 2/1998 |
| EP | 0 278 395 A2 | 8/1988 |
| JP | 61109039 A | 5/1986 |
| JP | 1306814 A | 12/1989 |
| JP | 4131891 A | 5/1992 |
| JP | 2004-317906 A | 11/2004 |
| JP | 2005-202145 A | 7/2005 |
| JP | 2007523369 A | 8/2007 |
| JP | 2007-264580 A | 10/2007 |
| JP | 2008-233875 A | 10/2008 |
| JP | 2009222881 A | 10/2009 |

OTHER PUBLICATIONS

Written Opinion issued Apr. 19, 2011 in counterpart international application No. PCT/JP2011/056547.
Japanese Office Action Dated Dec. 24, 2013 issued in Japanese Patent Application No. 2010-063042.
Office Action/Search Report dated Mar. 5, 2014 issued by the State Intellectual Property Office of P.R. China in counterpart Chinese Patent Application No. 201180014592.7.
Office Action dated Aug. 13, 2014 issued by the German Patent Office in counterpart German Patent Application No. 112011100943.7.
Japanese Office Action issued Jul. 1, 2014, in corresponding Japanese Application No. 2010-063042.
Chinese Office Action, Application No. 201180014592.7; Oct. 14, 2014.

* cited by examiner (a)

(b)

(a)

(b)

HEAD-UP DISPLAY DEVICE

CROSS REFERENCE TO RELATED APPLICATION

This application is a continuation of PCT application No. PCT/JP2011/056547, which was filed on Mar. 18, 2011 based on Japanese Patent Application (No. 2010-063042) filed on Mar. 18, 2010, the contents of which are incorporated herein by reference. Also, all the references cited herein are incorporated as a whole.

BACKGROUND OF THE INVENTION

1. Technical Field

The present invention relates to a head-up display device which projects a virtual image on a projection area of a windshield of a vehicle so that the projected virtual image is superimposed on a foreground of the vehicle, which is visually recognized from an eye point of the vehicle through the windshield, and visually recognized.

2. Background Art

In recent years, with the increase and diversification of information required when a driver is driving, a head-up display (HUD) device which causes urgent information or the like to be displayed as a virtual image on a windshield of a vehicle, and causes the virtual image to be superimposed on a foreground of the vehicle, which is visually recognized through the windshield, and visually recognized, is mounted on the vehicle, such as a car or a train.

In this kind of head-up display device, an image displayed on a display panel is reflected and enlarged by a flat mirror and a concave mirror, and the enlarged image is irradiated and reflected to a display area of the windshield of a car so that a virtual image of the image is visually recognized by the driver of the car (for example, refer to JP-A-2009-222881).

SUMMARY OF THE INVENTION

In the above-mentioned head-up display device, by providing a flat mirror in a housing and returning an optical path halfway with the flat mirror, the housing is downsized.

Since the inclination of the windshield on which a virtual image is projected varies for each of various types of vehicles, when the same head-up display device is mounted, a displacement in position where the virtual image is formed occurs for each type of vehicle.

Therefore, in order to offset the displacement in position where the virtual image is formed in a different type of vehicle, it is necessary to correct the displacement by changing the angle of the flat mirror, or changing the position of an indicator which irradiates display light.

However, when the angle change of the flat mirror or the position change of the indicator is performed in this way, the structure or shape of an attaching part of the flat mirror or the indicator must be changed, and as a result, a different housing has to be prepared for each of various types of vehicles, which becomes a factor of cost increase.

The present invention is made in view of the situation mentioned above, and an object of the present invention is to provide a head-up display device which can be applied to various types of vehicle without causing cost increase.

In order to achieve the object mentioned above, the present invention may be implemented by any one of the following (1) to (5).

(1) A head-up display device which makes a virtual image to be formed by projecting display light on a windshield of a vehicle, the head-up display device including:
a housing;
an indicator which is provided in the housing; and
a reflector which is provided in the housing, and includes a plurality of reflecting surfaces which are arranged in parallel with each other and inclined at the same angle so that a display light which is irradiated from the indicator is reflected by the reflecting surfaces.

(2) The head-up display device according to the configuration (1), wherein
the reflector includes a linear Fresnel lens in which a plurality of slopes which are arranged in parallel with each other and inclined at the same angle are formed, and the slopes become the reflecting surfaces by being mirrored.

(3) The head-up display device according to the configuration (2), wherein
the reflector is configured so that front surfaces of the slopes of the linear Fresnel lens which are mirrored become the reflecting surfaces, and the display light is reflected by the reflecting surfaces which include the front surfaces of the slopes.

(4) The head-up display device according to the configuration (2), wherein
the reflector is configured so that back surfaces opposite to front surfaces of the slopes of the linear Fresnel lens which are mirrored become the reflecting surfaces, and the display light which enters from the back surfaces of the linear Fresnel lens is reflected by the reflecting surfaces which include the back surfaces of the slopes.

(5) The head-up display device according to the configuration (4), wherein
the back surface of the linear Fresnel lens is inclined relative to a processed surface which is formed with the slopes.

In the head-up display device of the configuration (1), by incorporating the reflector which has reflecting surfaces of a suitable inclined angle corresponding to the inclination of the windshield which is mounted on the vehicle, it can be very easy to cause the head-up display device to be suited for the vehicle with device.

Therefore, it is unnecessary to correct by changing the angle of a flat mirror according to the type of a vehicle, or changing the position of the indicator which irradiates an image as when the flat mirror is used as the reflector, and thus the cost increase due to the fact that a different housing is prepared for each of various types of vehicles can be avoided.

In the head-up display device of the configuration (2), the display light from the indicator can be reflected towards a suitable direction by the reflecting surfaces which are formed of the slopes of the linear Fresnel lens in which the plurality of slopes which are arranged in parallel with each other and inclined at the same angle are formed.

In the head-up display device of the configuration (3), the display light from the indicator can be reflected towards a suitable direction by the reflecting surfaces which are formed of the front surfaces of the slopes of the linear Fresnel lens which are mirrored.

In the head-up display device of the configuration (4), the display light from the indicator which enters from the back surface of the linear Fresnel lens can be reflected towards a suitable direction by the reflecting surfaces which are formed of the back surfaces opposite to the front surfaces of the slopes of the linear Fresnel lens which are mirrored.

Since the valleys of the linear Fresnel lens, which are easy to be formed to have an acute angle when the processed surface is molded with a metal mold, become peaks when viewed from the side of the back surface, the display light can be prevented from being diffusely reflected at the peaks, and thus it can be avoided that the virtual image becomes hazy due to the occurrence of flare.

In the head-up display device of the configuration (5), since the back surface is inclined to the processed surface in which the slopes of the linear Fresnel lens are formed, the reflected light of the display light reflected with the back surface of the linear Fresnel lens is led towards a direction greatly different from that of the display light which is reflected by the reflecting surfaces, and will not reach the projection area of the windshield. Therefore, the trouble that the virtual image becomes hazy due to the reflected light by the back surface of the linear Fresnel lens can be avoided.

In order to achieve the object mentioned above, the present invention may be implemented by the following (6).

(6) A head-up display device which makes a virtual image to be formed by projecting display light on a windshield of a vehicle, the head-up display device including:

a housing;

an indicator which is provided in the housing; and a reflector which is provided in the housing, and includes a non-regular-reflection type holographic mirror which makes light that is irradiated from the indicator to be reflected at a reflection angle different from an incidence angle.

In the head-up display device of the configuration (6), by incorporating the reflector including the non-regular-reflection type holographic mirror of a suitable reflection angle corresponding to the inclination of the windshield which is mounted on the vehicle, it can be very easy to cause the head-up display device to be suited for the vehicle with device.

Therefore, it is unnecessary to correct by changing the angle of a flat mirror according to the type of a vehicle, or changing the position of the indicator which irradiates an image as when the flat mirror is used as the reflector, and thus the cost increase due to the fact that a different housing is prepared for each of various types of vehicles can be avoided.

According to the present invention, a head-up display device which can be applied to various types of vehicle can be provided without causing cost increase.

The invention is explained in brief above. Further, details of the invention will become more apparent after the embodiments of the invention described below are read with reference to the accompanying figures.

BRIEF DESCRIPTION OF THE DRAWINGS

FIG. 13 is diagrams which show a reflector of the head-up display device according to a third embodiment, in which FIG. 13(a) is its perspective view and FIG. 13(b) is its side view.

FIG. 14 is diagrams which show the reflector of the head-up display device according to the third embodiment, in which FIG. 14(a) is its perspective view and FIG. 14(b) is its side view.

DETAILED DESCRIPTION OF THE EXEMPLARY EMBODIMENTS

Next, embodiments of the present invention are described with reference to the figures.

First Embodiment

First, a head-up display device according to the first embodiment is described.

Figure 1:
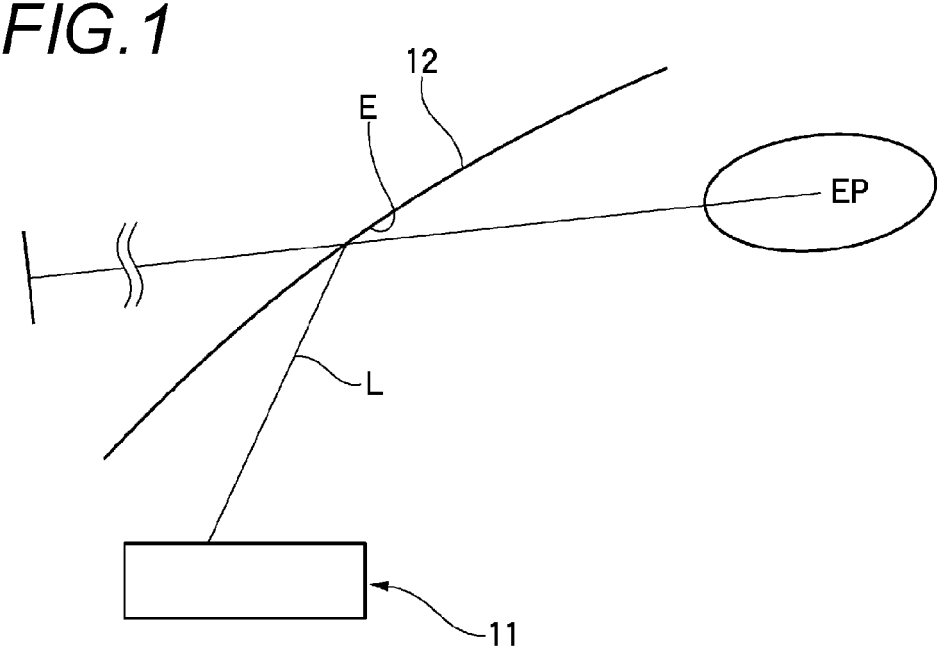
FIG. 1 is a schematic structural diagram which shows a state where a head-up display device is installed in a vehicle according to an embodiment of the present invention.

As shown in FIG. 1, a head-up display (HUD) device 11 is used after being installed in an instrument panel or on the instrument panel below a windshield (windshield glass) 12.

The head-up display device 11 projects display light L on a projection area E of the windshield 12, and forms a virtual image of display information on the projection area E so that the virtual image is superimposed on a foreground of a vehicle, which is visually recognized through the windshield 12, and visually recognized by a driver from the eye point (eye point) EP of the driver.

Figure 2:
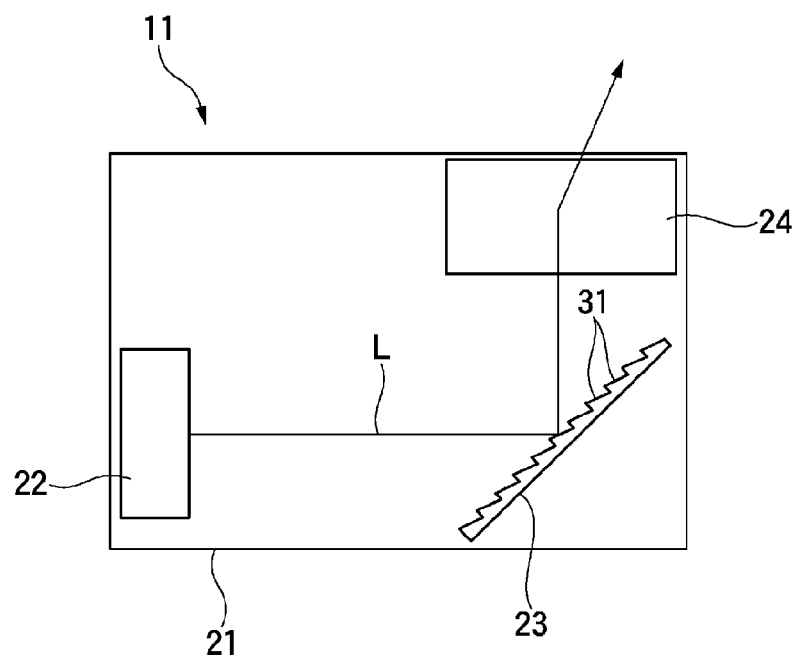
FIG. 2 is a schematic structural diagram which describes an internal structure of the head-up display device according to the embodiment of the present invention.

As shown in FIG. 2, the head-up display device 11 has a housing 21 which is provided below the windshield 12 of the vehicle, and an indicator 22 which irradiates the display light L is provided in the housing 21. A spontaneous optical device (for example, a field emission display, a fluorescent display tube, an electroluminescence display, or the like), a liquid crystal display with a backlight, or the like is used as the indicator 22.

A reflector 23 which reflects the display light L irradiated from the indicator 22 is provided in the housing 21, and the display light L reflected by the reflector 23 is enlarged by an enlargement mirror 24 and led to the windshield 12. The reflector 23 is fixed to a predetermined position in the housing 21, and is removable from the housing 21. Since the display light L irradiated from the indicator 22 is reflected and refracted by the reflector 23 so that the direction of the display light L is changed, the housing 21 of the head-up display device 11 is downsized.

Figure 3:
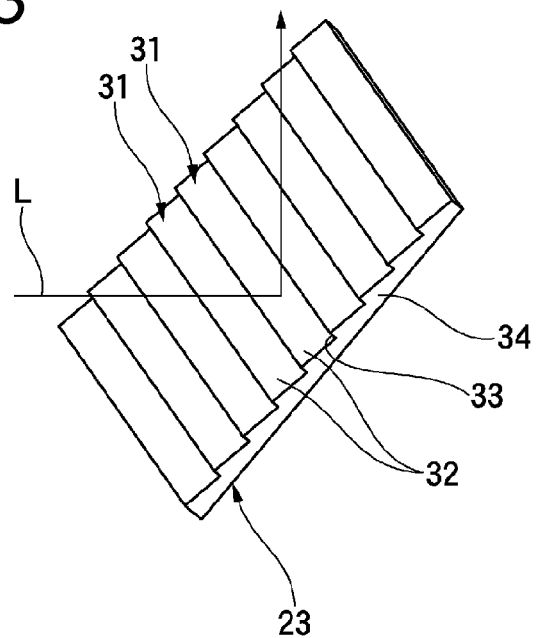
FIG. 3 is a perspective view which describes a reflector of the head-up display device according to a first embodiment.
Figure 4:
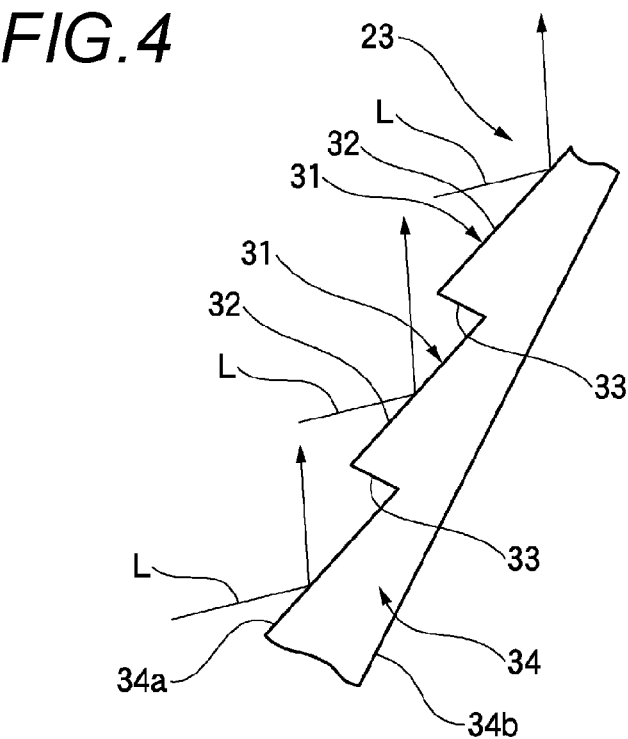
FIG. 4 is a sectional view of a part of the reflector of the head-up display device according to the first embodiment.

As shown in FIGS. 3 and 4, the reflector 23 has a plurality of reflecting surfaces 31 which are arranged in parallel with each other and inclined at the same angle, and the display light L irradiated from the indicator 22 is reflected respectively by the reflecting surfaces 31.

The reflector 23 includes a linear Fresnel lens 34, which is formed of a plurality of slopes 32, which are arranged in parallel with each other and inclined at the same angle, and vertical surfaces 33 which are the boundaries of adjoining slopes 32. A mirror finishing is performed on a processed surface 34a, which is formed with the slopes 32 and the vertical surfaces 33 of the linear Fresnel lens 34, with aluminum vapor deposition, and thereby the front surfaces of the slopes 32 of the linear Fresnel lens 34 become the reflecting surfaces 31, respectively.

The linear Fresnel lens 34 is formed of a light transmitting material, and for example, is formed by injection molding transparent resin. For example, the light transmitting material may be a plastics base material. Thermoplastics resin, thermosetting resin, or resins which can be hardened by energy rays such as ultraviolet rays or electron beams, may be used as the plastics. Specifically, for example, polyolefin resin, such as polyethylene and polypropylene, polyolefin resin, such as polyethylene terephthalate, cellulosic resin, such as triacetyl cellulose and butyl cellulose, polystyrene, polyurethane, vinyl chloride, acrylic resin, polycarbonate resin and polyester resin are included.

Figure 5:
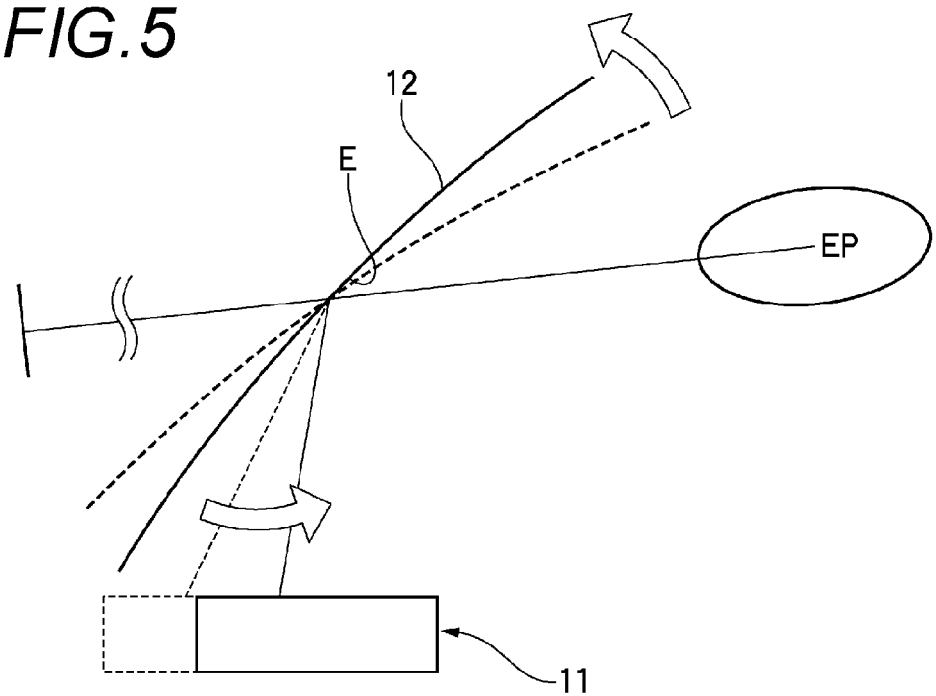
FIG. 5 is a schematic structural diagram which describes a way of correction at the time of installing in a different type of vehicle.

As shown in FIG. 5, the inclination of the windshield 12 on which a virtual image is projected varies in different types of vehicles in which the head-up display device 11 is installed. Therefore, in order to cause the virtual image to be projected on a predetermined projection area E of the windshield 12, it is necessary to move the position of the head-up display device 11 so that the radiation direction of the display light L from the head-up display device 11 is changed.

According to the head-up display device 11 of this embodiment, in order to change the radiation direction of the display light L, first, the reflector 23 whose radiation direction is not suitable is removed from the housing 21. Then, the reflector 23 is replaced with a reflector 23 which has reflecting surfaces 31 of a suitable inclined angle corresponding to the inclination of the windshield 12 which is mounted on the vehicle.

Figure 6:
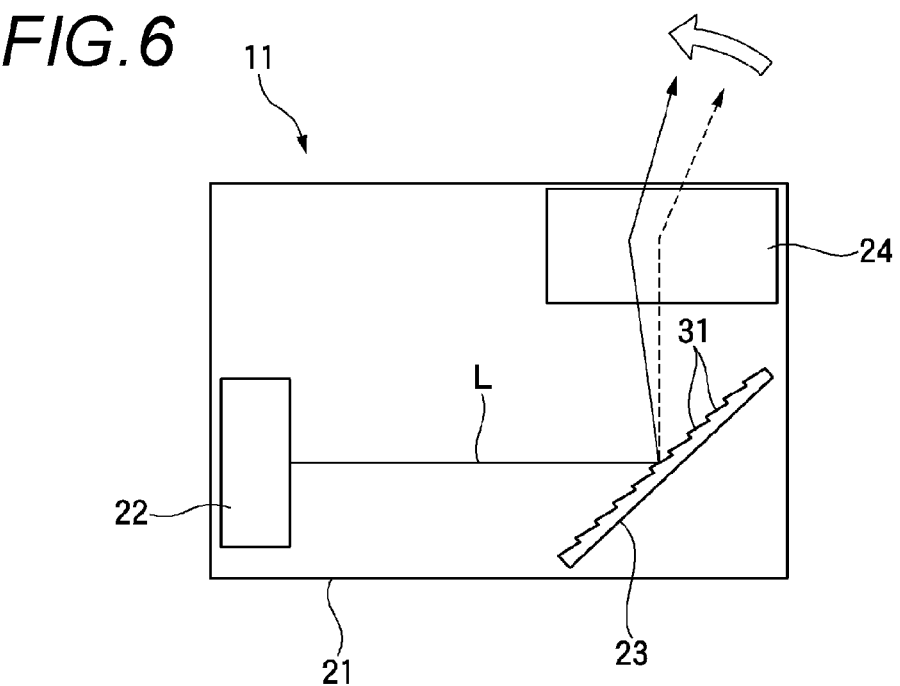
FIG. 6 is a schematic structural diagram which describes the correction of the radiation direction of display light in the head-up display device.

In this way, as shown in FIG. 6, the reflection angle of the display light L on the reflector 23 can be easily corrected to an angle which suits the windshield 12 of the vehicle.

That is, according to this embodiment, by removing the reflector 23 from the housing 21, and incorporating a reflector 23 which has reflecting surfaces 31 of an inclined angle corresponding to the inclination of the windshield 12 which is mounted on the vehicle, it can be very easy to cause the head-up display device 11 to be suited for the carrying vehicle.

Therefore, it is unnecessary to correct by changing the angle of a flat mirror according to the type of a vehicle, or changing the position of the indicator which irradiates an image as applied when the flat mirror is used as the reflector, and thus the cost increase because a different housing is prepared for various types of vehicles can be avoided.

Second Embodiment

Next, a head-up display device 11 according to a second embodiment is described.

The same structure and the same components as those in the above-mentioned first embodiment are given the same symbols, and their descriptions are omitted.

Figure 7:
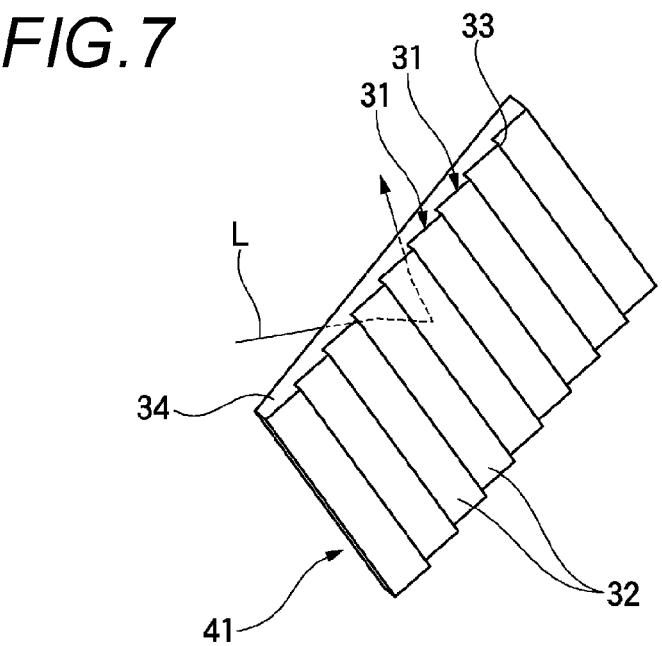
FIG. 7 is a perspective view which describes a reflector of the head-up display device according to a second embodiment.
Figure 8:
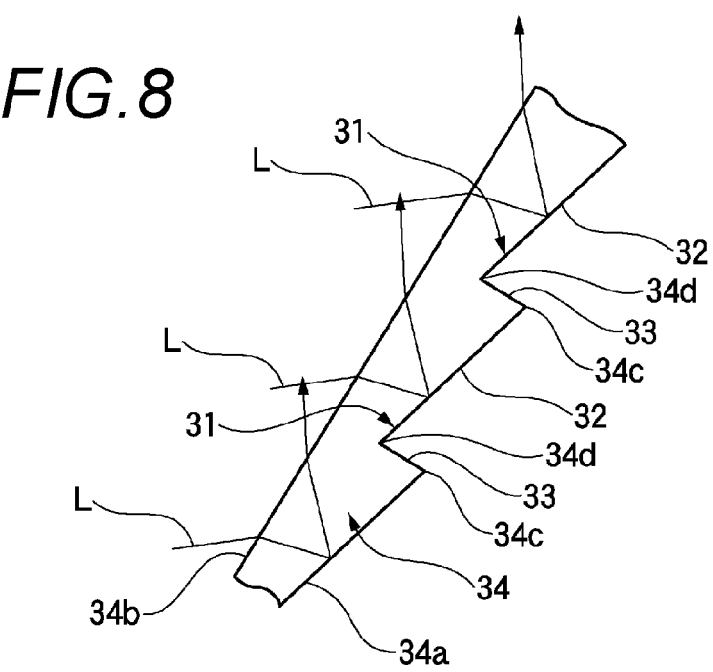
FIG. 8 is a sectional view of a part of the reflector of the head-up display device according to the second embodiment.

As shown in FIGS. 7 and 8, in the second embodiment, a reflector 41, which is formed by reversing the front and back surfaces of the reflector 23 used in the first embodiment, is used after being attached in the housing 21 of the head-up display device 11.

That is, in the reflector 41, the back surfaces opposite to the front surfaces of the slopes 32, on which a mirror finishing is performed with aluminum vapor deposition, of the linear Fresnel lens 34 become the reflecting surfaces 31.

Therefore, the display light L from the indicator 22 enters from the back surface 34b of the linear Fresnel lens 34 which forms the reflector 41, is reflected by the reflecting surfaces 31 which are formed with the back surfaces of the slopes 32, further exits from the back surface 34b of the linear Fresnel lens 34, and is led to the windshield 12 through the enlargement mirror 24.

Figure 9:
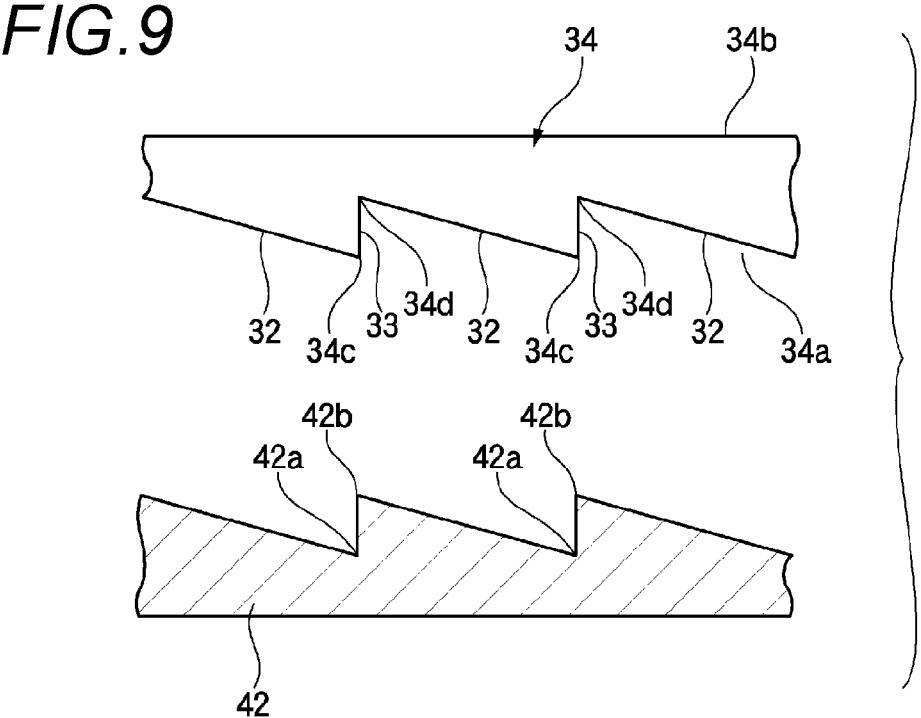
FIG. 9 is a schematic sectional view which describes a method of molding a linear Fresnel lens which forms the reflector.
Figure 10:
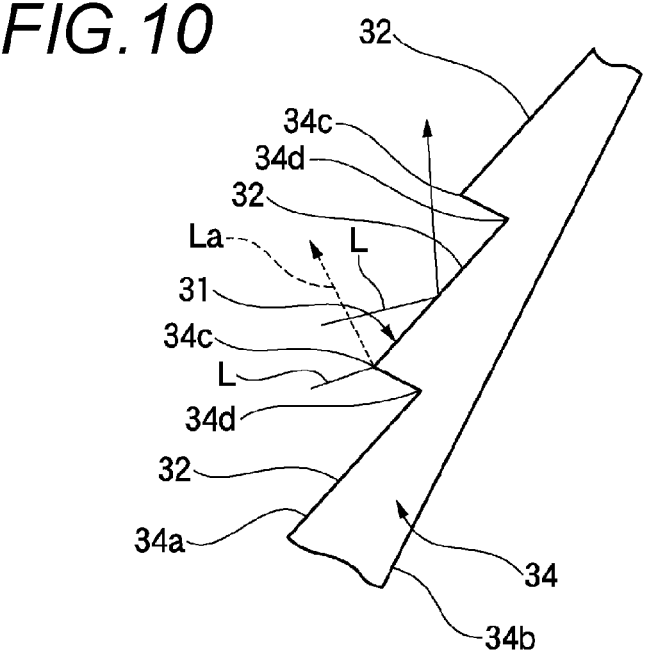
FIG. 10 is a sectional view of a part of the reflector which describes the occurrence of flare in the reflector.

As shown in FIG. 9, when the linear Fresnel lens 34 is formed with injection molding or the like by using a metal mold 42, in a processed surface 34a of the linear Fresnel lens 34, peaks 34c are formed with valleys 42a of the metal mold 42, and valleys 34d are formed with peaks 42b of the metal mold 42. When the metal mold 42 is manufactured with machining such as cutting, the peaks 42b can be easily formed to have an acute angle, but it is difficult for the valleys 42a to be formed to have an acute angle because a cutting tool does not arrive. Therefore, in the linear Fresnel lens 34 fabricated with the metal mold 42, although it is easy to form the valleys 34d of an acute angle, the peaks 34c may be roundish without being formed to have an acute angle as compared with the valleys 34d. Then, as shown in FIG. 10, when the display light L is reflected on the processed surface 34a of the linear Fresnel lens 34, the display light L is reflected diffusely by the roundish peaks 34c, and there is a possibility that flare occurs with the diffusely reflected light La so that the virtual image may become hazy.

In contrast, in the reflector 41 according to the second embodiment, since the back surfaces opposite to the front surfaces of the slopes 32, on which a mirror finishing is performed with aluminum vapor deposition, of the linear Fresnel lens 34 become the reflecting surfaces 31, the valleys 34d of an acute angle at the side of the processed surface 34a become peaks when viewed from the side of the back surface 34b. Therefore, in the reflector 41 of this second embodiment, the display light L can be prevented from being diffusely reflected at the peaks, and thus it can be avoided that the virtual image becomes hazy due to the occurrence of flare.

Figure 11:
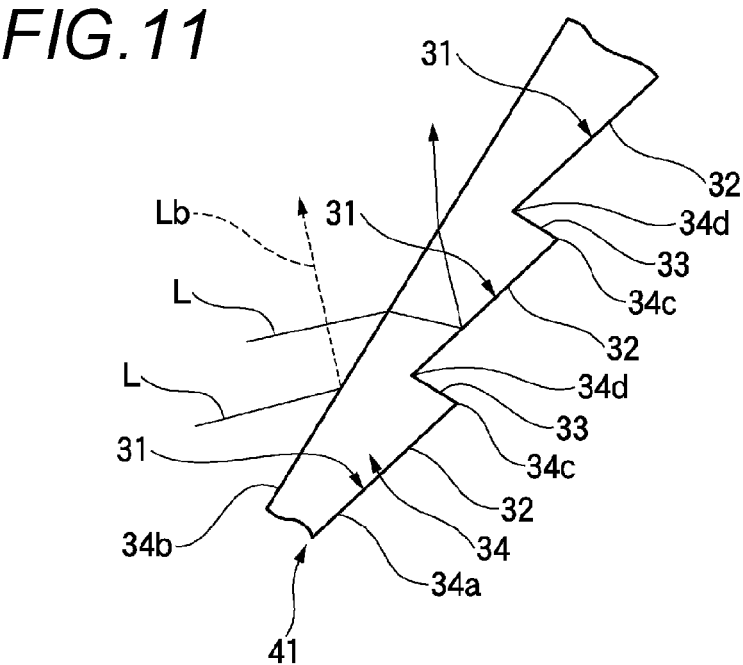
FIG. 11 is a sectional view of a part of the reflector which describes the occurrence of reflected light on the back surface of the reflector of the head-up display device according to the second embodiment.

In the reflector 41 of the above second embodiment, the back surfaces opposite to the front surfaces of the slopes 32, on which a mirror finishing is performed with aluminum vapor deposition, of the linear Fresnel lens 34 become the reflecting surfaces 31, and the display light L from the indicator 22 is caused to enter from the back surface 34b of the linear Fresnel lens 34 and be reflected by the reflecting surfaces 31 which are formed with the back surfaces of the slopes 32. Therefore, as shown in FIG. 11, the display light L is also reflected by the back surface 34b of the linear Fresnel lens 34, and the virtual image of the windshield 12 may become hazy due to this reflected light Lb.

Figure 12:
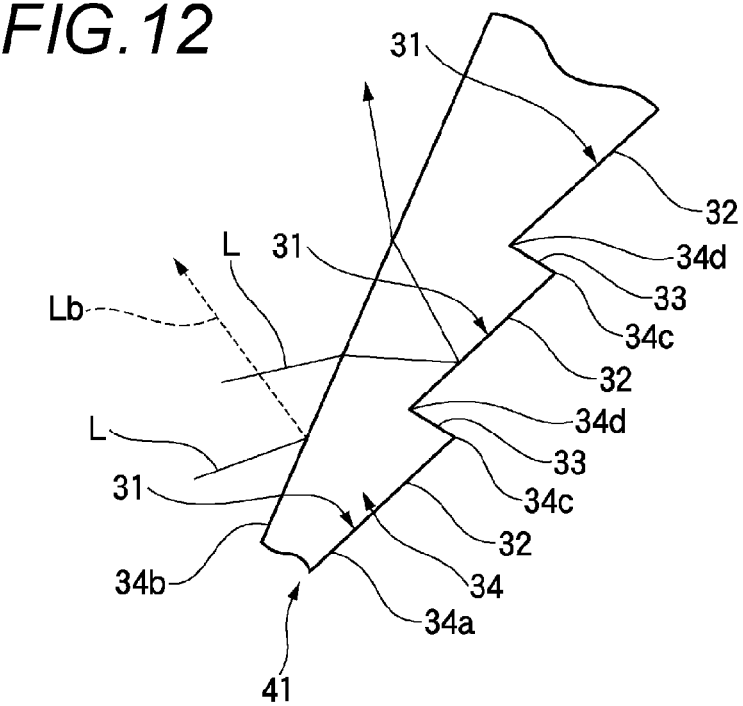
FIG. 12 is a sectional view which describes a variation of the reflector of the head-up display device according to the second embodiment.

Therefore, when the back surfaces opposite to the front surfaces of the slopes 32, on which a mirror finishing is performed with aluminum vapor deposition, of the linear Fresnel lens 34 become the reflecting surfaces 31, as shown in FIG. 12, it is preferable that in the linear Fresnel lens 34 the back surface 34b is inclined to the processed surface 34a where the slopes 32 are formed.

Thus, when the back surface 34b is inclined to the processed surface 34a, the reflected light Lb of the display light L which is reflected by the back surface 34b is led towards a direction greatly different from that of the display light L which is reflected by the reflecting surfaces 31, and will not reach the projection area E of the windshield 12. Therefore, the trouble that the virtual image becomes hazy due to the reflected light Lb by the back surface 34b of the linear Fresnel lens 34 can be avoided.

In the reflectors 23 and 41 using the linear Fresnel lens 34, in order to prevent the occurrence of flare as much as possible, it is preferable to form the peaks at the reflection side of the display light L to have an angle as acute as possible, and in order to prevent the reflection of light on the vertical surfaces 33, it is preferable to color the vertical surfaces 33 in black or the like to make light hard to be reflected. By forming the slopes 32 serving as the reflecting surfaces 31 as smooth as possible, the occurrence of flare due to the diffuse reflection on the reflecting surfaces 31 can be suppressed.

Third Embodiment

Next, a head-up display device 11 according to a third embodiment is described.

The same structure and the same components as those in the above-mentioned first and second embodiments are given the same symbols, and their descriptions are omitted.

Figure 13:
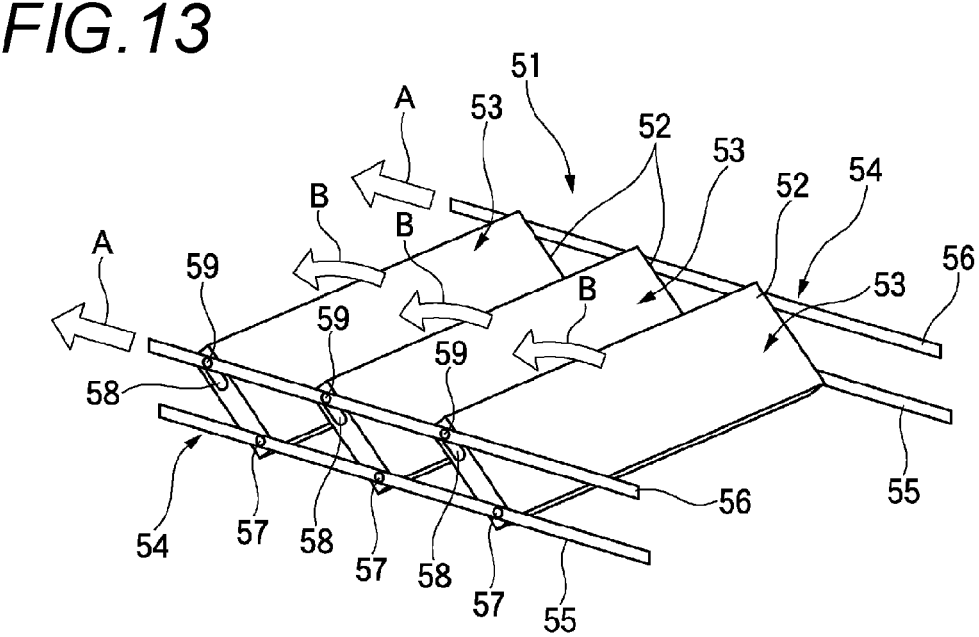
Figure 13:
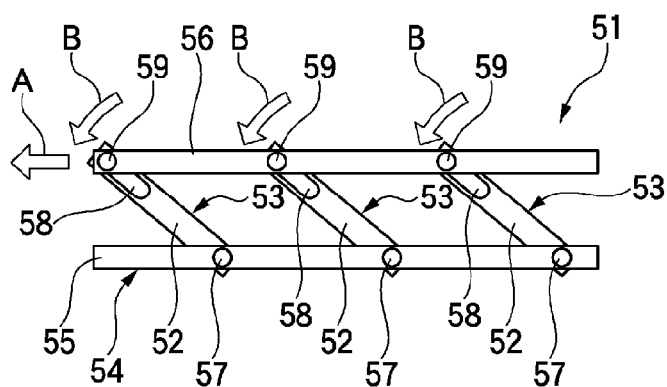

As shown in FIGS. 13(a) and 13(b), in the third embodiment, a reflector 51 which has a plurality of reflecting plates 52 is used in the head-up display device 11. Each of these reflecting plates 52 includes a mirror formed in a rectangular shape viewed from top, and the front surfaces of these reflecting plates 52 become reflecting surfaces 53. The short edges of these reflecting plates 52 are mutually connected by link mechanisms 54, and therefore are arranged in parallel with each other and inclined at the same angle.

Each of the link mechanisms 54 includes a fixed link 55 which supports one end of each of the short edges of the reflecting plates 52, and a movable link 56 which supports the other end of each of the short edges of the reflecting plates 52. A hole (not shown in the figure) is formed at one end of each of the short edges of the reflecting plates 52, and a rotation pin 57 which is provided in the fixed link 55 is inserted into the hole. Thereby, the reflecting plates 52 are rotatably connected to the fixed links 55. A long groove 58 which is extended in the widthwise direction of the reflecting plate 52 is formed at the other end of each of the short edges of the reflecting plates 52, and a sliding pin 59 which is provided in the movable link 56 is slidably inserted into the long groove 58.

Figure 14:
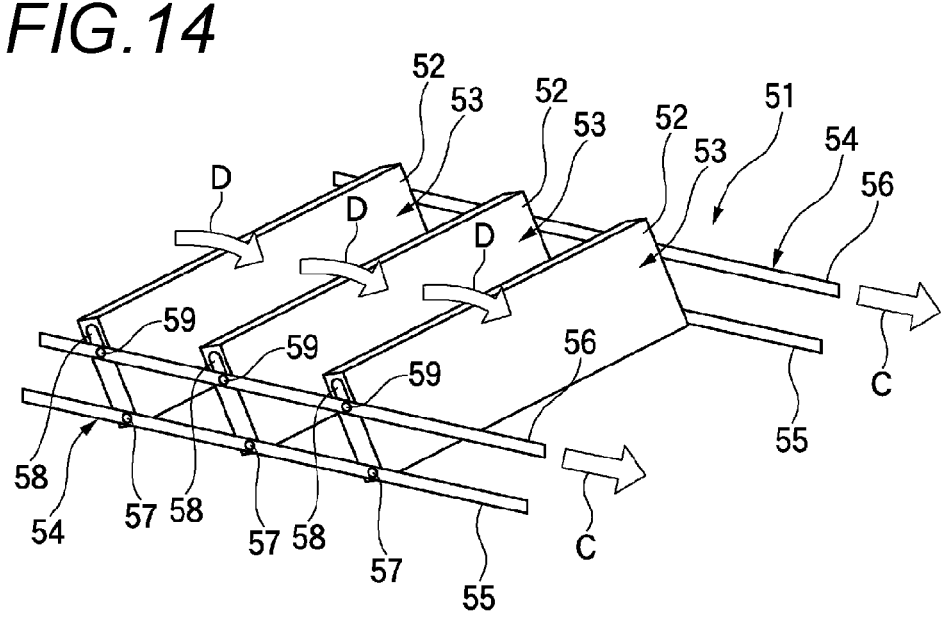
Figure 14:
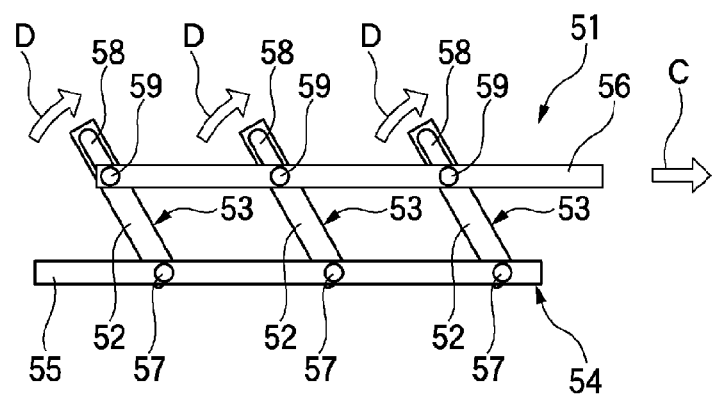

In the reflector 51 which includes such link mechanisms 54, by allowing the movable links 56 to slide, each of the reflecting plates 52 rotates around the connecting place with the fixed links 55. In the reflector 51, if the movable links 56 are moved in the direction of arrow A in FIGS. 13(a) and 13(b), each of the reflecting plates 52 rotates in the direction of arrow B while the parallelism and the same inclination angle are maintained, and thus each of the reflecting plates 52 is laid down so that the inclination angle decreases. Conversely, if the movable links 56 are moved in the direction of arrow C as shown in FIGS. 14(a) and 14(b), each of the reflecting plates 52 rotates in the direction of arrow D while the parallelism and the same inclination angle are maintained, and thus each of the reflecting plates 52 is raised up so that the inclination angle increases.

Thus, according to the above third embodiment, by adjusting the inclination angle of the plurality of reflecting plates 52 which are arranged in parallel with each other and inclined at the same angle, it can be very easy to allow the head-up display device to be suited for the carrying vehicle.

The movable links 56 of the reflector 51 may be moved manually or electrically.

Figure 15:
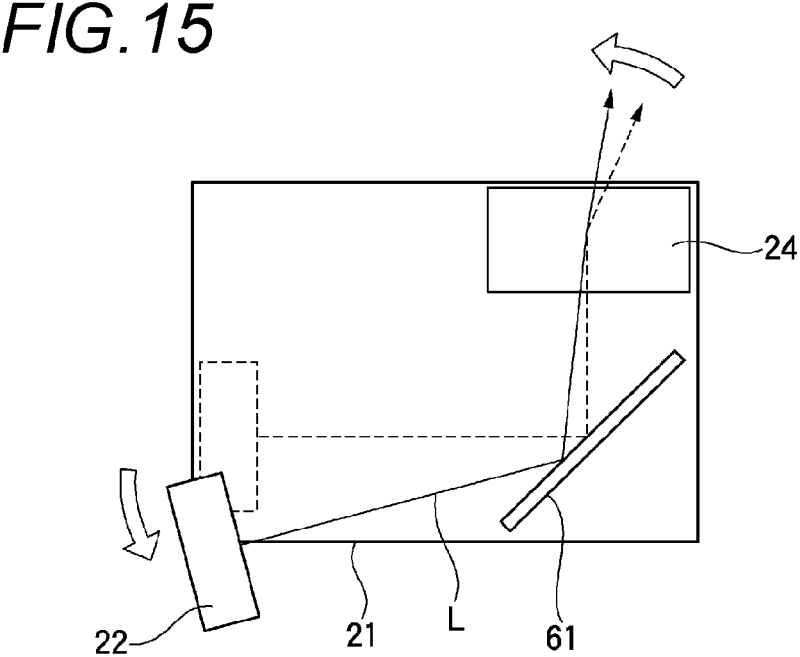
FIG. 15 is a schematic structural diagram which shows a reference example of head-up display device.
Figure 16:
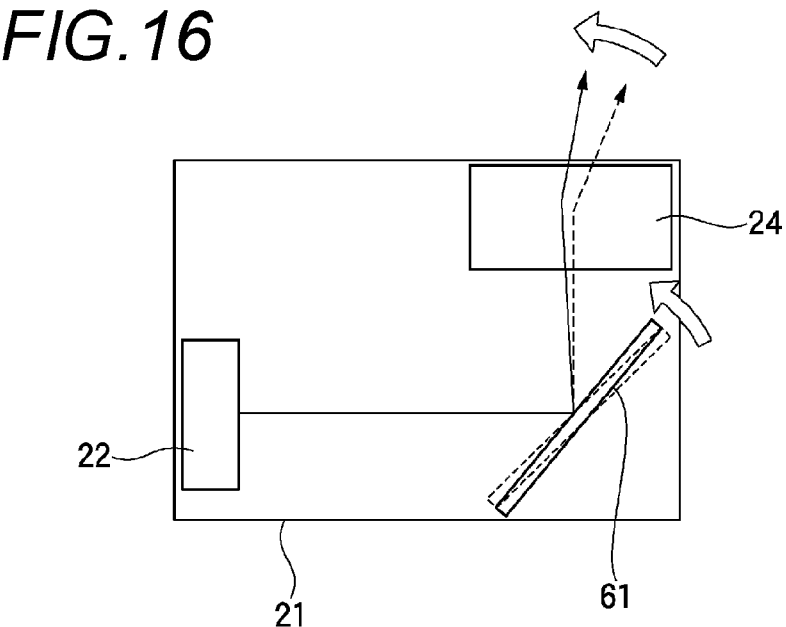
FIG. 16 is a schematic structural diagram which shows a reference example of head-up display device.

In order to describe further advantages of the present invention, reference examples are shown in FIGS. 15 and 16.

FIGS. 15 and 16 show a head-up display device in which one piece of flat mirror 61 is provided in a housing 21 as a reflector.

When the flat mirror 61 is used as the reflector in this way, in order to mount various kinds of vehicles the inclinations of whose windshields 12, on which a virtual image is made to be projected, vary, the position of the indicator 22 must be moved to change the radiation direction of the display light L, as shown in FIG. 15, or the angle of the flat mirror 61 must be changed, as shown in FIG. 16.

That is, in the head-up display device using the flat mirror 61, with the change of structure or shape relative to the housing 21, a different housing 21 has to be prepared for each of various types of vehicles, which becomes a factor of cost increase.

In contrast, according to this embodiment, even if the head-up display device is mounted in various kinds of vehicles the inclination of whose windshields 12, on which a virtual image is made to be projected, vary, since the reflectors 23 or 41 which has a reflection angle that is adapted for the inclination of the windshield 12 can be attached, or the reflecting plates 52 of the reflector 51 can be adjusted to an angle which is adapted for the inclination of the windshield 12, the change of structure or shape relative to the housing 21 is not required. Therefore, the cost increase due to the fact that a different housing 21 is prepared for each of various types of vehicles can be avoided.

Although the reflector 51 which has the reflectors 23 or 41 or a plurality of reflecting plates 52 which form the linear Fresnel lens 34 is used in the above-mentioned embodiment, it is also possible to use a non-regular-reflection type holographic mirror for which the incidence angle differs from the reflection angle as an reflector and to make the reflector which includes the non-regular-reflection type holographic mirror to be removable from the housing 21.

If the reflector which includes the non-regular-reflection type holographic mirror is included, by incorporating the reflector including the non-regular-reflection type holographic mirror of a suitable reflection angle corresponding to the inclination of the windshield 12 which is mounted on a vehicle into a housing, it can be very easy to make the head-up display device 11 to be suited for the vehicle on which it is mounted.

The present invention is not restricted to the above-described embodiments, and suitable modifications, improvements, and the like can be made. Moreover, the materials, shapes, dimensions, numbers, installation places, and the like of the components in the above embodiments are arbitrarily set as far as the invention can be attained, and not particularly restricted.

Although the present invention is described in detail with reference to the embodiments, it is apparent that various modifications and amendments may be made by those skilled in the art without departing from the spirit and scope of the invention.

According to the present invention, a head-up display device which can be applied to various types of vehicle can be provided without causing cost increase.

What is claimed is:

1. A head-up display device which makes a virtual image to be formed by projecting display light in a virtual-image forming area on a windshield of a vehicle, the head-up display device comprising:

a housing disposed below the windshield;

an indicator which is provided in the housing;

a reflector which is detachably fixed at a predetermined position in the housing to reflect a display light which is irradiated directly from the indicator; and an enlargement mirror by which the display light reflected by the reflector is enlarged and led to the virtual-image forming area on the windshield, wherein the reflector includes a linear Fresnel lens in which a plurality of slopes which are arranged in parallel with each other and inclined at the same angle are formed, and the slopes serve as reflecting surfaces by being mirrored, the linear Fresnel lens being formed by injection molding of resin, and the reflector is selected and fixed in the housing so that the angle of the slopes is set to direct the display light output from the housing toward the virtual-image forming area on the windshield through the enlargement mirror.

2. The head-up display device according to claim 1, wherein
front surfaces of the slopes of the reflector serve as the reflecting surfaces.

3. The head-up display device according to claim 1, wherein
back surfaces opposite to front surfaces of the slopes of the reflector serve as the reflecting surfaces, and the display light which enters from the back surfaces of the linear Fresnel lens is reflected by the reflecting surfaces.

4. The head-up display device according to claim 3, wherein
the back surface of the linear Fresnel lens is inclined relative to a processed surface which is formed with the slopes.

* * * * *